United States Patent

Leyburn et al.

[15] 3,705,275

[45] Dec. 5, 1972

[54] TELEPHONE TRUNK TESTING SYSTEM

[72] Inventors: Derek Leyburn, Ottawa; Murray Allan Davey, Thornhill, Ontario, both of Canada

[73] Assignee: The Bell Telephone Company of Canada, Quebec, Canada

[22] Filed: Sept. 30, 1971

[21] Appl. No.: 185,185

[52] U.S. Cl. .......................................... 179/175.3

[51] Int. Cl. .......................................... H04b 3/46

[58] Field of Search ............... 179/175.3, 175.2 R, 26

[56] References Cited

UNITED STATES PATENTS 3,506,794 4/1970 Chulak ......................... 179/175.2 R

*Primary Examiner*—Kathleen H. Claffy
*Assistant Examiner*—Douglas W. Olms
*Attorney*—David M. Rogers et al.

[57] ABSTRACT

A system for testing telephone trunks, particularly trunks in tandem extending between three or more crossbar offices, in which each trunk circuit is given a line location and a local telephone number in its own office. The switching equipment in each office is arranged so that when it receives a trunk circuit telephone number from a test board, it establishes a connection directly to that trunk circuit, as if it were a line circuit. Thus, the test board in one office can select a trunk to a second office, thereby seizing a register-sender in the second office; it can then dial into that register-sender the telephone number of a desired trunk from the second office to a third office, thus seizing a register-sender in the third office, and it can then dial into such register-sender the telephone number of test equipment in the third office, allowing the trunks to be tested in tandem.

6 Claims, 10 Drawing Figures

TELEPHONE TRUNK TESTING SYSTEM

This invention relates to apparatus for testing telephone or other communications network switching systems, and it relates particularly to apparatus for testing telephone trunks in crossbar telephone offices.

Present day telephone systems usually contain a number of central offices, each serving its own customers, with groups of inter-office trunks connecting the offices together. These trunks must be tested periodically to ensure that their transmission and other characteristics meet required standards. Complex equipment presently exists to enable test equipment in an office to connect to any inter-office trunk which terminates in that office. However, present day equipment cannot conveniently test trunks in tandem (i.e., two or more trunks in series connecting a pair of offices via an intermediate office). The difficulty is that although test equipment in the calling office can select a desired trunk to the intermediate office, there is no convenient way for the calling office to select a particular trunk from the intermediate office to the called office. This is because in most existing telephone systems, the switching equipment in the intermediate office will automatically select a group of trunks to the called office and will then sequentially select a trunk from that group, so that all trunks will receive equal use. There is normally no way to select a given trunk on any call. Thus, the test equipment in the calling office does not know which trunk it is testing between the intermediate office and the called office, and it has no way of selecting a desired trunk.

Accordingly, it is an object of the present invention in its preferred form to provide a telephone system which will permit test equipment in a first office to select and test a desired combination of trunks in tandem, i.e., to select a desired trunk from a first office (in which the test center is located) to a second office and then to select a further desired trunk from the second office to a third office. This is accomplished by in effect assigning a telephone number to each trunk so that it can be dialled directly from the test center and by arranging the switching equipment of each telephone office to recognize a test call and to respond by cancelling normal sequential selection of trunks and instead to select trunks according to digits dialled by the test center.

Further objects and advantages of the invention will appear from the following description, taken together with the accompanying drawings, in which.

Figure 1:
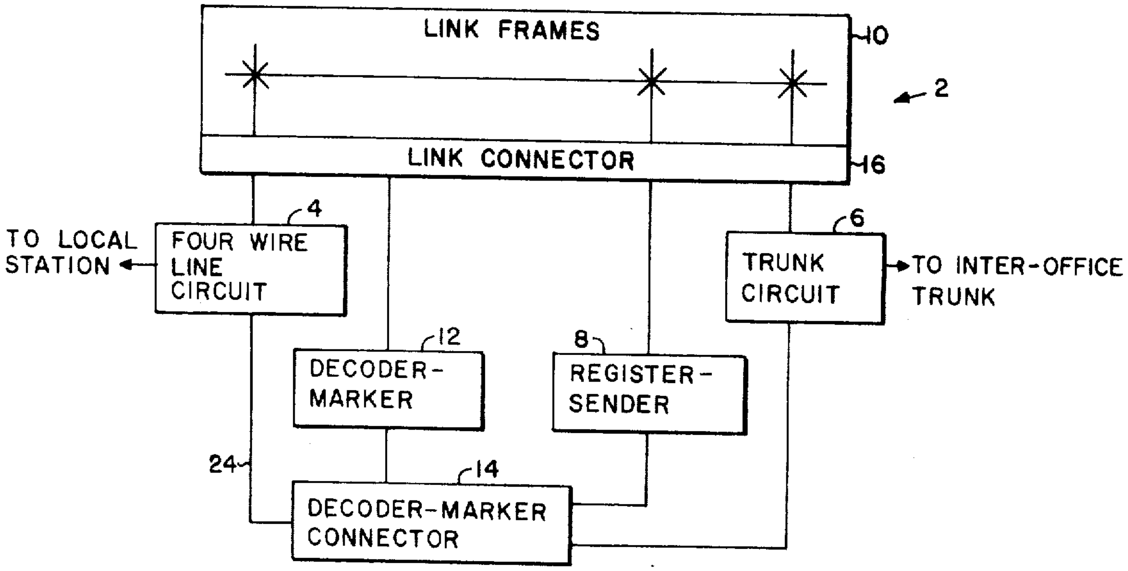
FIG. 1 (PRIOR ART)
FIG. 1 is a block diagram showing a typical prior art office or switching machine with which the invention may be used.

In the accompanying drawings, conventional detached contact notation is used, wherein a "–" and an "$x$," when marked with relay contact letters and numbers, represent relay contacts that are closed and opened respectively when the relay is de-energized. Crossbar switch cross-points are indicated by conventional $x$ symbols, either unnumbered or marked with simple numerals, instead of with relay contact notation.

The invention will be described with reference to a four wire crossbar switching machine manufactured and sold by Western Electric Company under its model No. 758 C. Since this is a standard commercially available common control office utilizing well known principles, it will be described only to the extent necessary to explain the invention. This switching office, indicated generally at 2 in FIG. 1, includes four wire station line circuits 4 which connect local customers to the office, two-way tie trunk circuits 6 which terminate trunks between offices, register-senders 8 which receive and store digits dialled by a customer or by a register-sender in another office and which can also transmit digits on inter-office calls, and link frames 10 which contain crossbar switches to which the line and trunk circuits and register-senders within the office are connected. The office 2 also includes one or more decoder-markers 12 which decode dialled digits and control the inter-connection of line circuits, trunk circuits and register-senders within the office, decoder-marker connectors 14 which connect the decoder-markers to line and trunk circuits and to the register-senders for the transfer of control information, and link connectors 16 which connect the decoder-markers 12 to the link frames for the selection and closing of cross-points and for transfer of some control information.

Figure 2:
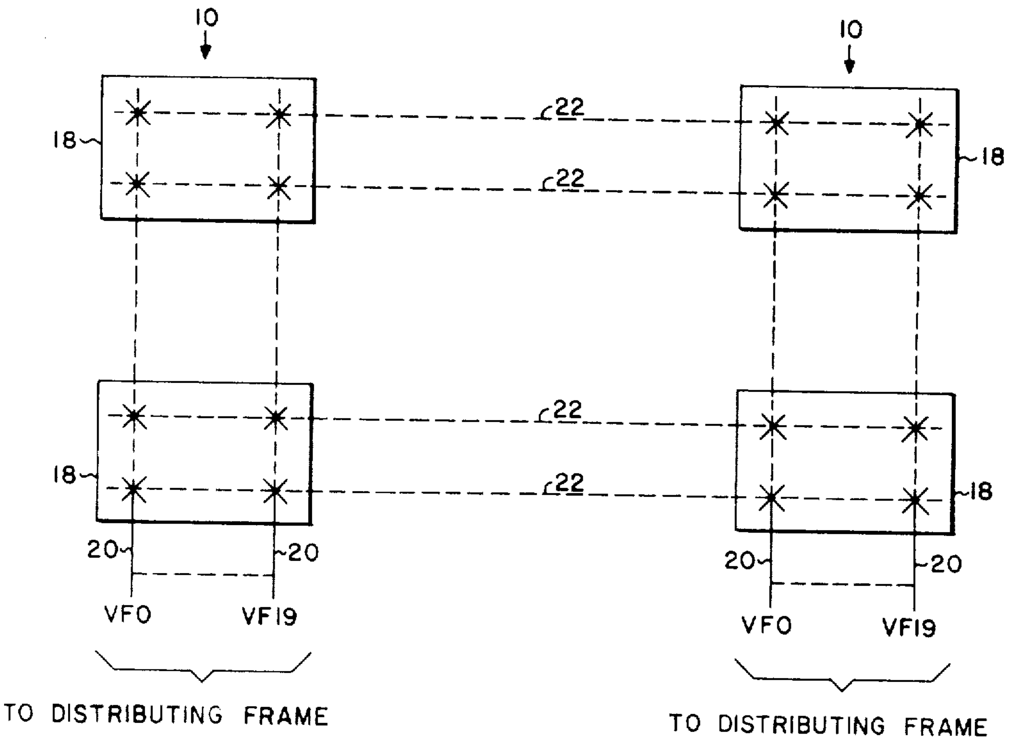
FIG. 2 (PRIOR ART)
FIG. 2 is a block diagram showing the arrangement of crossbar switches or link frames of the FIG. 1 office.

The link frames 10 are shown in more detail in FIG. 2. In the model 758 C office there may be up to 28 link frames 10 (FIG. 2) each containing up to 10 six-contact 10 by 20 cross-point crossbar switches 18. Two of the contacts of each cross-point are used for the transmit pair of a connection, two for the receive pair, and the remaining two are used as internal control leads. In the model 758 C office, the crossbar switches 18 are mounted one above the other and their verticals 20 are multiplied together. The 20 crossbar verticals of each link frame are called terminations or vertical files (and are numbered from VF0 to VF19 for each link frame) and are cross-connected (on a distributing frame, not shown) to line circuits, trunk circuits and register-senders. The ten horizontals 22 of each crossbar switch are called links and are multiplied to the horizontals on like-numbered crossbar switches on other link frames. The links 22 are used to connect one vertical to another.

It will be seen from the above that the crossbar linkage of the office 2 is in the form of a square matrix. This provides a single link internal connection during a call, i.e. only one horizontal link 22 is used to inter-connect all the circuits required for a call. Thus, there may be a line or trunk circuit, a register-sender and another line or trunk circuit all inter-connected on the same horizontal link. (The register-sender will release itself from this connection once it has completed its function.)

The operation of the switching machine 2 is as follows. On a request for service from a line circuit 4, effected when a customer station goes off-hook, the line relay (not shown) in the line circuit 4 grounds connection 24 via the decoder-marker connector 14 to the decoder-marker 12, seizing the decoder-marker. The decoder-marker 12 then seizes the calling line circuit 4 via the link connector 16 and obtains the calling line location and class-of-service. At the same time, the decoder-marker 12 selects an idle register-sender 8 via the link connector 16. The decoder-marker transfers to the register-sender the information as to the calling line location and class-of-service, and closes appropriate cross-points to establish a dial connection between the calling line circuit 4 and the selected register-sender 8. The decoder-marker 12 then releases. Dial tone is provided by the register-sender 8 to the calling line circuit 4, so that the calling party may dial.

The register-sender 8 receives and stores the incoming digits. In this type of office six digits are used, the first three (NNX) as office codes and the second three (HTU) as directory numbers representing called numbers within offices. In addition, the register-sender 8 stores two digits representing the calling line class-of-service, received from the decoder-marker. These digits are a class-of-services tens digit (CT) and a class-of-service units digit (CU), derived from the calling line location. The class-of-service digits are used in the conventional 758 C office to control routing of calls between offices, i.e. calls are permitted certain routes and destinations depending on their class-of-service. After the register-sender 8 has received some or all of the dialled digits, it calls in the decoder-marker 12 again, via the decoder-marker connector 14, and passes to the decoder-marker the NNX code for an inter-office call or the called HTU directory number for a local call, together with the horizontal link number and the calling class-of-service.

On local calls, the decoder-marker 12, from the called directory number information, seizes and tests the called line circuit in the connector 16, operates appropriate cross-points to connect the called line circuit to the horizontal link 22 being used on the call, instructs the register-sender 8 to release, and operates the ringing switch (not shown) to apply ringing to the called line. On calls between offices, the decoder-marker 12 seizes and tests an idle trunk circuit 6 and closes appropriate cross-points to connect this trunk circuit to the horizontal link being used for the call. The decoder-marker then releases, leaving the calling line circuit 4, outgoing trunk circuit 6 and register-sender 8 all connected to one horizontal link.

If the call is direct to the receiving office, the register-sender transmits the two class-of-service digits CT, CU, and the called directory number HTU. If the call is through an intermediate office, the register-sender sends, in addition, the called office code NNX. The receiving office is able to distinguish between office codes and directory numbers, so that it can direct the received digits to appropriate digit "bins" (i.e. relays) in its register-sender, because in the model 758 C office, the first digit of all office codes is always different from the first digit of all directory numbers. For example, office codes typically begin with 2 or 3, and directory numbers typically begin with 4 to 9. The digits sent and received by the model no. 758 C office are shown in Table I at the end of this description.

Figure 3:
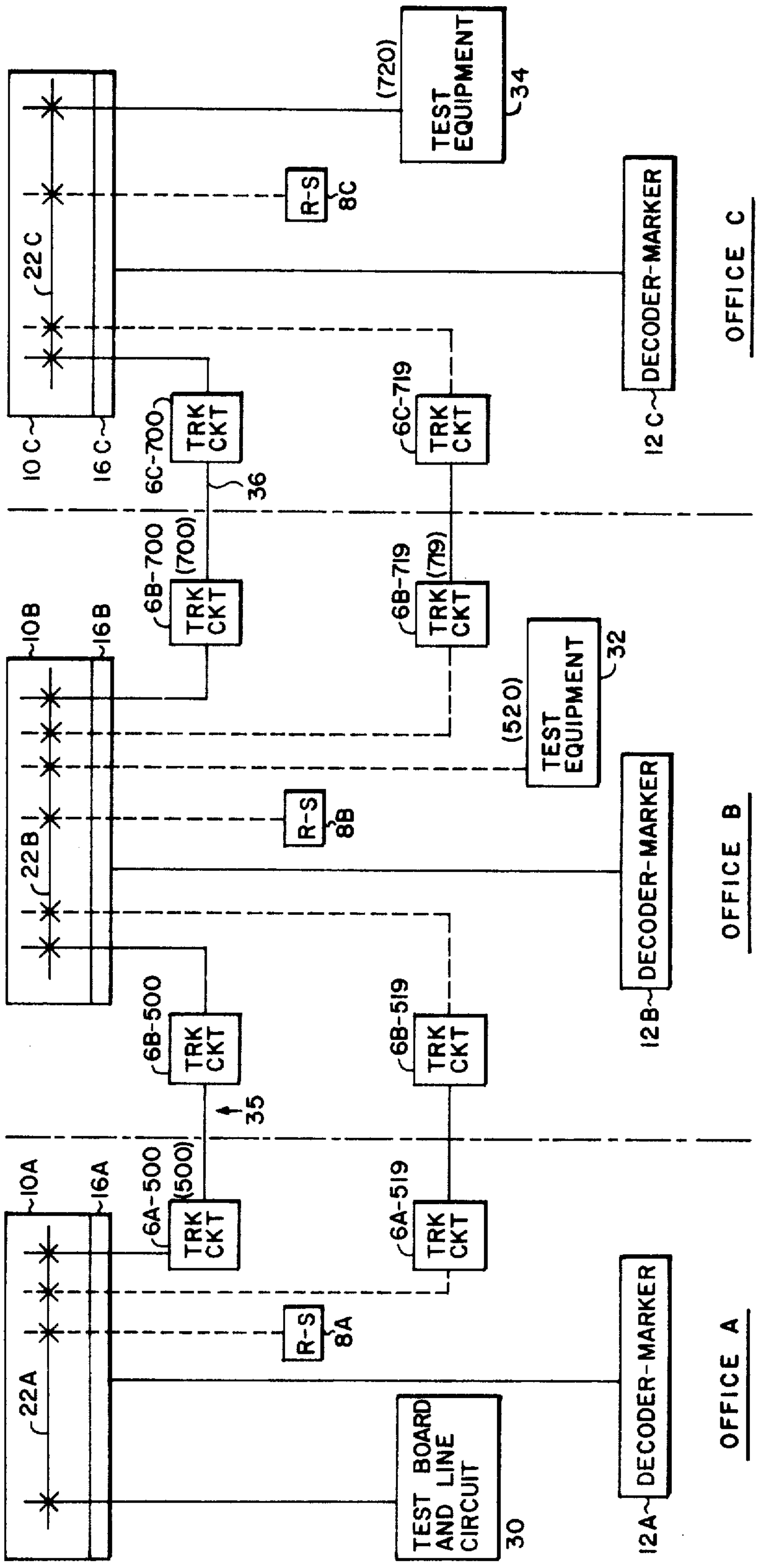
FIG. 3 is a block diagram showing three FIG. 1 offices connected together to illustrate the application of the invention thereto.

Reference is next made to FIG. 3, which shows three model no. 758 C offices A, B, C, each located in a different city and modified according to the invention. Parts corresponding to those of FIG. 1 are given the same reference numerals in FIG. 3, but with an A, B or C to indicate the office to which each belongs. In addition, office A includes a test board 30 for testing trunks, and offices B and C include test equipment 32, 34 which can be reached by the test board 30 in office A and which cooperates with the test board to conduct tests. Trunks 35 connect offices A and B, and trunks 36 connect offices B and C. According to the invention, each trunk circuit 6A, 6B, 6C is assigned a local telephone number, i.e., its office code is that of the office in which it is located, and it has a directory number. It is assumed for explanatory purposes that the directory numbers of trunk circuits 6A to office B are 500 to 519, so that trunk circuits 6A are indicated in FIG. 3 as 6A–500 to 6A–519. It is assumed for simplicity that the directory numbers of the trunk circuits 6B connected to trunk circuits 6A are also 500 to 519, so that the trunk circuits 6B connected to office A are indicated in FIG. 3 as 6B–500 to 6B–519 (these trunk circuits 6B could of course have quite different office B directory numbers if desired). The trunks 35 inter-connecting these trunk circuits are thus numbered 500 to 519.

It is similarly assumed that the directory numbers of trunk circuits 6B connected to office C are 700 to 719, so that these trunk circuits are marked 6B–700 to 6B–719 in FIG. 3, with the corresponding trunks 36 to office C and corresponding trunk circuits in office C being marked 700 to 719 and 6C–700 to 6C–719 respectively. The test equipment is also assigned a directory number, assumed here to be 520 for test equipment 32 and 720 for test equipment 34.

The operation of the FIG. 3 system will first be explained generally, and then the manner in which it performs its functions will be explained in more detail. Assume that the test board 30 wishes to test trunk 500 from office A to office B. The test board 30 goes off-hook, which causes the decoder-marker 12A to connect the register-sender 8A to the test board 30 via a crossbar link 22A. This supplies the test board with dial tone, and the operator at the test board then dials the office code for office A, together with the directory number 500. The register-sender 8A, after receiving this information, passes the dialled digits to the decoder-marker 12A together with the class-of-service of the calling line location. As will be explained presently, the decoder-marker 12A is wired to respond to the received digits to connect the called trunk circuit 6A–500 to link 22A and hence to the test board just as if this were a local call to a local line circuit. The decoder-marker 12A also instructs the register-sender 8A that it is to release, and prevents ringing.

Once the test board 30 is thus connected to trunk circuit 6A–500, the corresponding trunk circuit 6B–500 is seized over trunk 500. The seizure operates the line relay (not shown) in trunk circuit 6B–500, causing the decoder-marker 12B to connect an idle register-sender 8B to trunk circuit 6B–500. Dial tone is now supplied for the second time to the test board 30 (the first dial tone was supplied by register-sender 8A), informing the test board operator that he may dial. The situation is now that the test board 30 is connected directly to the register-sender 8B in office B, whereas had an ordinary customer placed the call, he would have been connected to the register-sender 8B via the local register-sender 8A in office A, and not direct.

Assume that the test board 30 wishes to reach test equipment 32 in office B. This is in effect a call to a local telephone number in office B. On a conventional customer call from office A terminating at office B, register-sender 8A in office A would transmit to register-sender 8B five digits, namely the two class-of-service digits CT, CU, and the directory number HTU of the called party in office B (as shown in Table I). Since the test board is now connected directly to the register-sender 8B, the test board now transmits these digits by dialling the appropriate class-of-service digits and the directory number 520 of test equipment 32. The class-of-service digits indicate to the decoder-marker 12B in office B that this is a test call and that the calling party (the test board 30) is authorized to be connected to the test equipment 32. The decoder-marker 12B then effects the required connection, so that trunk 500 and trunk circuits 6A–500, 6B–500 can be tested.

Assume that all of the trunks and trunk circuits between offices A and B have been tested, and that the test board operator in office A now wishes to test trunk 700 from office B to office C. In that case, the test board operator first gains access to the register-sender 8B in office B via a tested trunk (e.g. trunk 500), as before, by dialling the office A office code plus the directory number for trunk circuit 6A–500. Next, the test board operator dials two class-of-service digits, and the directory number 700 for trunk circuit 6B–700. When the register-sender 8B in office B receives this information, it calls in the decoder-marker 12B in office B, which responds to the received digits to seize trunk circuit 6B–700 as if it were a local line circuit, and to connect it to the trunk circuit 6B–500 via an idle link 22B. The decoder-marker 12B instructs register-sender 8B that there is to be no outpulsing, and register-sender 8B releases.

The seizure of trunk circuit 6B–700 operates the line relay (not shown) in trunk circuit 6C–700, via trunk 700 between these trunk circuits. This calls in decoder-marker 12C, which connects an idle register-sender 8C in office C to the trunk circuit 6C–700 via an idle link 22C. The register-sender 8C supplies dial tone for the third time to the test board operator in office A, informing him that he may dial. The test board operator then dials the appropriate two class-of-service digits and the appropriate directory number 720 of the test equipment 34 in office C. The decoder-marker 12C then connects test circuit 34 to trunk circuit 6C–700 via the link 22C. This completes the connection of the test board 30 through the two tandem trunks 500 and 700 to the test equipment 34 in office C, allowing testing of the trunks in tandem. Since all the characteristics of trunk 500 and trunk circuits 6A–500, 6B–500 are known, the characteristics of trunk 700 and trunk circuits 6B–700, 6C–700 can readily be ascertained.

Figure 4:
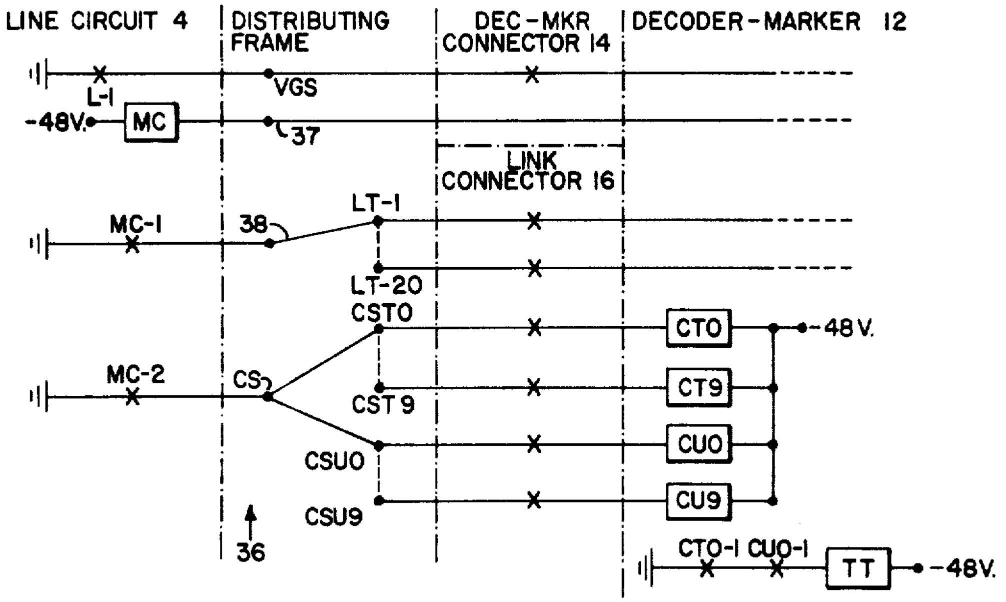
FIG. 4 shows portions of a line circuit, distributing frame and decoder-marker of the FIG. 1 office, arranged in accordance with the invention.

The manner in which the invention performs the functions just discussed will now be described in more detail. Reference is first made to FIG. 4, which shows a portion of a local line circuit 4, together with cross-connections 36 on the distributing frame (the distributing frame carries the cross-connections from line and trunk circuits to the connector circuits). When a station (such as the test board 30) goes off-hook, a line relay (not shown) in its line circuit operates, and contact L–1 of the line relay grounds vertical start lead VGS (one of leads 24 of FIG. 1) to the decoder-marker connector 14 (FIG. 1). The decoder-marker connector 14 seizes an idle decoder-marker 12. When the decoder-marker is seized, it seizes via the link connector circuit 16 the appropriate link frame 10 (FIG. 2) to which the calling line circuit is connected (having identified the link frame by the particular VGS lead that was grounded). The decoder-marker 12 also grounds lead 37 (FIG. 4) to the line circuit, operating marker connect relay MC therein (informing the line circuit that the decoder-marker has been connected).

When relay MC operates, its contacts connect a number of information leads from the line circuit 4 through the link connector 16 to the decoder-marker. Among these leads is lead 38, which is cross-connected to one of twenty terminals LT1 to LT20 on the distributing frame. One of these terminals LT1 to LT20 is grounded by contact MC–1, and this informs the decoder-marker 12 as to which vertical file the calling line circuit is connected in the link frame.

In addition, the line circuit 4 has a class-of-service lead CS which is grounded by contact MC-2. The distributing frame has, for each link frame, 10 class-of-service tens terminals CST0 to CST9 and 10 class-of-service units terminals CSU0 to CSU9. These 20 terminals are connected by 20 leads through the link connector 16 to appropriate class-of-service relays CT0 to CT9 and CU0 to CU9 in the decoder-marker 12. The Class-of-service lead CS in the line circuit 4 is cross-connected through cross-connections 36 to one appropriate CST- and one CSU- terminal in the distributing frame, depending on the particular class-of-service of the calline line circuit 4. Thus, for each call, two class-of-service relays, namely one CST- and one CSU-relay, operate in the decoder-marker. The above described operation is all that of a standard model 758 C office.

For the invention, class-of-service 00 is arbitrarily assigned as a testing class-of-service, so that for the line circuit of the test board, lead CS is cross-connected as shown to terminals CST–0 and CSU–0 in the distributing frame. This operates relays CT0 and CU0 in the decoder-marker 12. Contacts CT0–1 and CU0–1 then operate testing relay TT, but this performs no function at the present time.

When the decoder-marker seizes a register-sender 8 and connects it to the calling circuit, it also passes to the register-sender the class-of-service of the calling line and then releases, as discussed. After the register-sender has received the called number, it recalls the decoder-marker 12 and passes to it the called number, the calling line circuit location, and the class-of-service of the calling line circuit, re-operating relays CT0 and CU0 and hence relay TT. The functions of relay TT will be explained presently.

Figure 5:
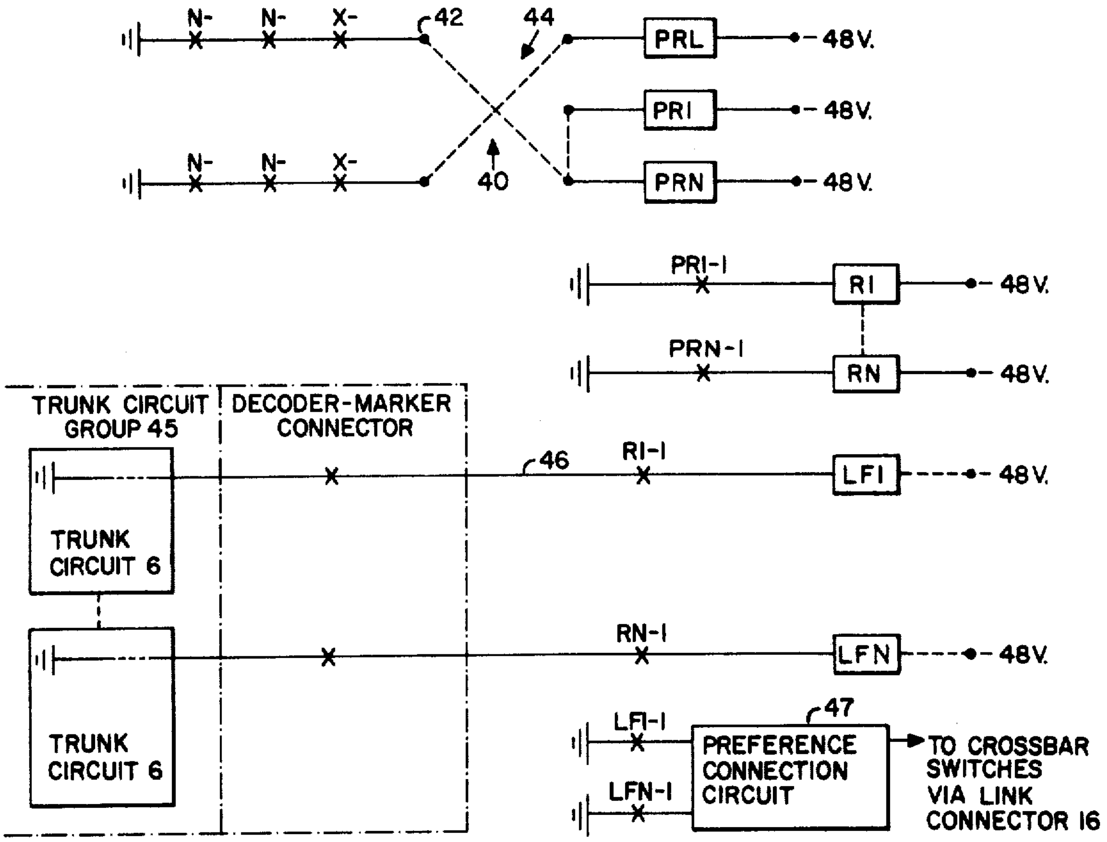
FIG. 5 shows a portion of an office code field and trunk circuit group of the FIG. 1 office.

The decoder-marker 12 includes (FIG. 5) a cross-connection code field 40 for NNX (office) codes, to determine whether a given call is a local call or is to terminate in some other office. Code field 40 includes a number of code terminals 42, one for each office code in the system. Each terminal 42 connected to ground through relay contacts N–, N– and X– of relays (not shown) in the decoder-marker which operate on receipt of the NNX code from the register-sender 8. The code terminals 42 are cross-connected by cross-connections 44 to program relays PRL and PR1 to PRN. Relay PRL is for local calls, and relays PR1 to PRN are for calls to other offices, one of relays PR1 to PRN being for each outgoing trunk group from the office 2. Depending on the office code dialled, an appropriate one of relays PRL, PR1 to PRN operates when the called number is transferred from the register-sender to the decoder-marker. If the call is an outgoing call, one of relays PR1 to PRN operate, and one of contacts PR1–1 to PRN–1 then closes to operate an appropriate route relay R1 to RN. Again, these relays are standard equipment in a model 758 C office. In addition, standard means (not shown) are provided to operate relay PRL on receipt of an inter-office call terminating in the office (in which case no NNX code will be received).

The route relays R1 to RN are used for several purposes. Firstly, they act as connectors to connect their associated trunk group through to the decoder-marker. One typical trunk group, that for relay R1, is shown at 45 in FIG. 5. Every idle trunk in the group signals its idle condition by extending a ground on leads 46 toward the decoder-marker through contacts R1–1 to R1–N of relay R1. When relay R1 operates, the grounds from the idle trunks in group 45 are connected through contacts R1–1 to R1–N to operate relays LF1 to LFN in the decoder-marker. This informs the decoder-marker which trunks in the group are idle. The decoder-marker is equipped with a preference and connection circuit 47 which selects one of the idle trunk circuits and which changes preference after each operation. Circuit 47 is informed by operated contacts LF1–1 to LFN–1 of relays LF1 to LFN as to which trunks in the group are idle. Then the decoder-marker, over circuit 47 and the link connector circuit 16, operates appropriate cross-points in the crossbar switches to connect the selected idle trunk circuit to the horizontal link being used for the call. This arrangement for trunk selection is entirely conventional in the model 758 C office.

Figure 6:
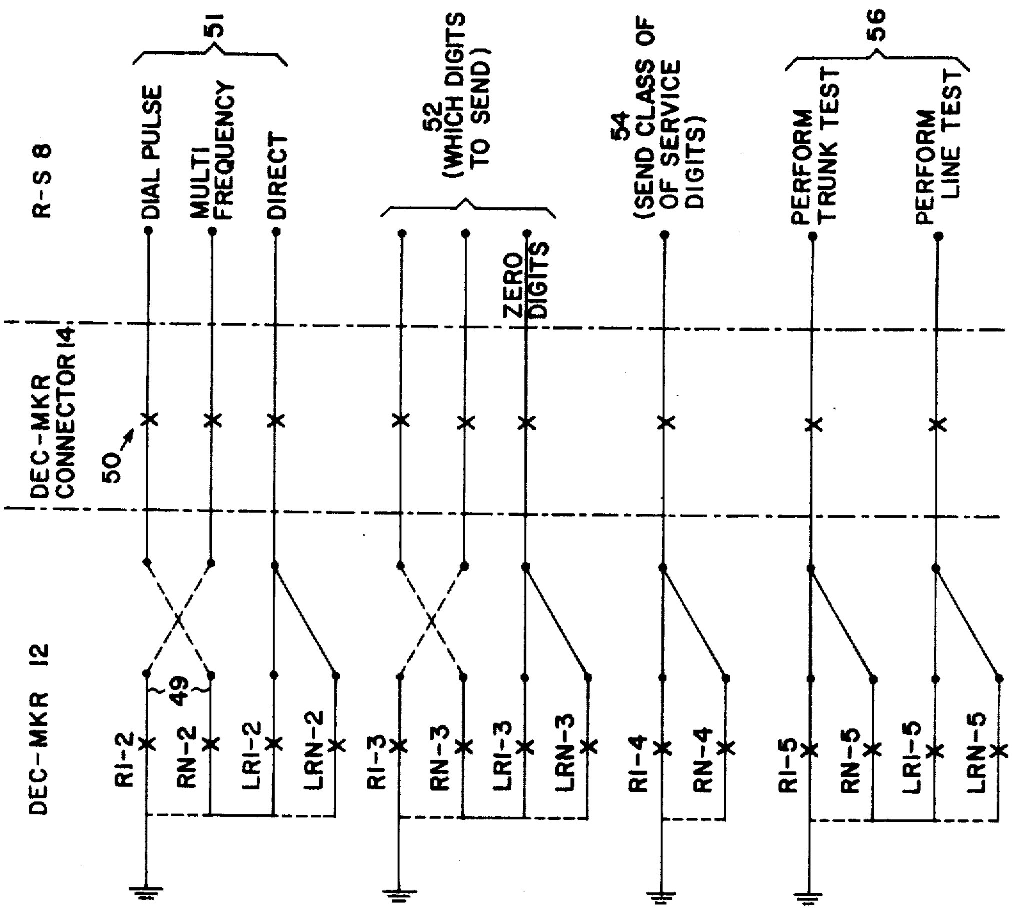
FIG. 6 shows a portion of a decoder-marker, connector and register-sender of the FIG. 1 office, arranged in accordance with the invention.

In addition, the route relays R1 to RN are used to inform the register-sender 8 that the class-of-service should be sent, and as to the type of outpulsing to use (dial pulse, multifrequency or direct), which digits to send (i.e. whether to delete digits such as the office code), and whether to test for a trunk circuit or a line circuit (in the model 758 C office, the called line or trunk circuit is attached before the register-sender releases and the register-sender tests the called circuit). As shown in FIG. 6, contacts R1–2 to RN–2 of the route relays are connected so that when a route relay operates, it grounds one of leads 49 from the decoder-marker through the decoder-marker connector contacts 50 to register-sender terminals 51, informing the register-sender as to the type of outpulsing to use. One of contacts R1–3 to RN–3 closes to ground one of terminals 52 in the register-sender, instructing the register-sender which digits to send; one of contacts R1–4 to RN–4 closes to ground one of terminals 54 in the register-sender to instruct the latter to send the two class-of-service digits; and one of contacts R1–5 to RN–5 closes to ground one of terminals 56 in the register-sender, to instruct the latter to perform either a line test or a trunk test. This is also conventional for a model 758 C office.

Figure 7:
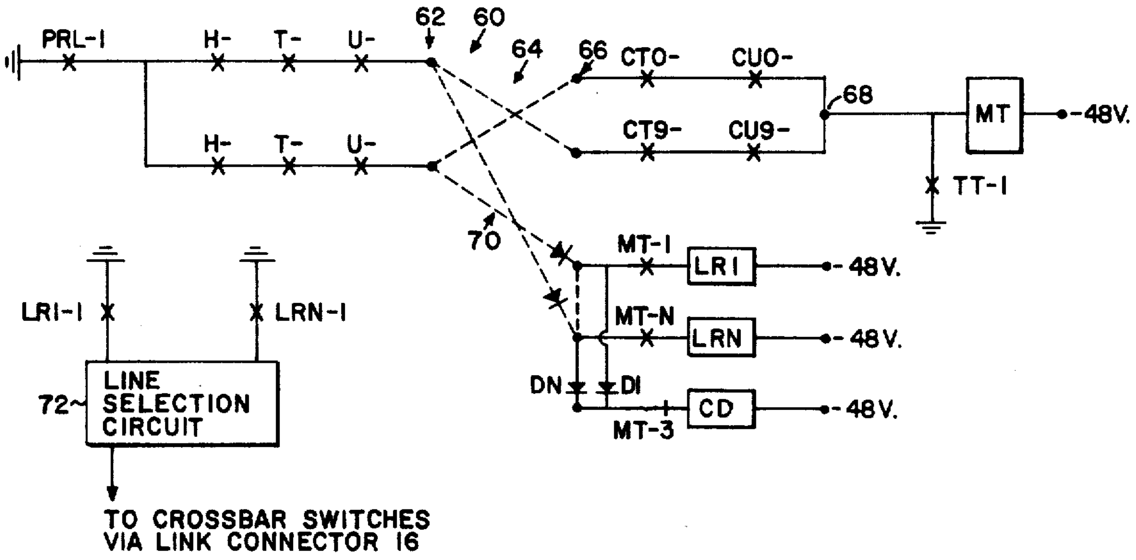
FIG. 7 shows a portion of a directory number field of the FIG. 1 office, arranged in accordance with the invention.

When the local office code is dialled, for local calls, relay PRL operates, as mentioned. Contact PRL–1 closes to enable a local completing code field 60, shown in FIG. 7. This code field includes a number of code terminals 62, one for each possible called number in the office. Each code terminal 62 is connected through contact PRL–1 to ground through contacts H–, T– and U– of relays (not shown) in the decoder-marker which operate on receipt of the hundreds, tens and units digits of the called number from the register-sender. Thus, one of the code points 62 will be grounded whenever a local number in the office is called.

The code terminals 62 are cross-connected via a cross-connection field 64 to class-of-service terminals 66. The class-of-service terminals 66 are connected through contacts of the class-of-service relays CT–, CU– to terminal 68 which is in turn connected to a match check relay MT. One combination of contacts of the class-of-service tens relay CT and of the class-of-service units relay CU exists for each class-of-service in the system. Each called number code terminal 62 is also cross-connected via cross-connections 70 to an appropriate local route relay LR1 to LR–N and through diodes D1 to DN to a slow operate call denied relay CD, all through contacts of the match check relay MT. There is one local route relay for each directory number hundreds digit, i.e., if there are six directory number hundreds digits, there are six local route relays LR1 to LR6, one for each hundreds digit. All of the code points 62 having a given hundreds digit are cross-connected by connections 70 to the local route relay for that hundreds digit, e.g. the code points 62 for directory numbers 400 to 499 are all cross-connected to local route relay LR1.

In operation, when a local call is made and the called number and calling class-of-service are passed to the decoder-marker, a ground appears on one called number code terminal 62, depending on the number dialled, and one combination of relays CT, CU is operated, depending on the class-of-service of the calling line circuit. The connections of CT– and CU– contacts are arranged so that if the calling party is allowed to make this call, then the ground on code terminal 62, extended through cross-connection field 64 to a class-of-service terminal 66, is extended through the CT– and CU– contacts to operate the match check relay MT. Contacts MT–1 to MT–N then close to permit operation of the appropriate local route relay LR1 to LRN, and other relay MT contacts (not shown) permit completion of the call. If the calling party is not allowed to make a call to the number in question, then his class-of-service and the called number will not match and there will be no ground extended to terminal 68 to operate relay MT. After about 30 milliseconds, the ground extended from the called number code terminal 62 operates called denied relay CD, and contacts (not shown) of relay CD then route the call to vacant code.

As mentioned, the operation of a given local routing relay LR during a local call indicates to the decoder-marker the hundreds digit of the called directory number. The decoder-marker uses this information to determine in which group of link frames 10 the called circuit is located (the link frames are arranged in up to six groups of five link frames each, maximum 28 link frames, and there are six available directory number hundreds digits 4 to 9 inclusive, one for each link frame group). It will be recalled that each link frame contains twenty vertical files or terminations (FIG. 2), so there are up to 100 vertical files in each link frame group. The tens digit of the called directory number is used to select the half of the link frame on which the called circuit is located, and the units digit is used to select the called circuit on the selected half link frame. This is all quite standard, and accordingly, in FIG. 7 the circuits in the decoder-marker by which the decoder-marker decodes the directory number tens and units digits and then operates appropriate cross-points to connect the called circuit to the horizontal link being used on the call are diagrammatically indicated at 72. Contacts LR1-1 to LRN-1 (FIG. 7) of the local route relays are shown connected to circuit 72 to inform it of the called link frame group, as mentioned.

According to the invention, contacts TT-1 of relay TT are connected between terminal 68 and ground. Thus, whenever the test board makes a call, match check relay MT operates, permitting the call to continue, so that in effect the test board has a universal class-of-service.

In addition, in accordance with the invention, each trunk circuit 6 is assigned a local telephone number, so there is a code terminal 62 for each trunk circuit. (It should be noted that in cases where it is not desired to match called numbers against the calling class-of-service and then to deny certain calls, then the cross-connections 64 through the CU- and CT- contacts to relay MT, may be omitted, as may relays MT and CD. In that case there will merely be one code point 62 for each possible called hundreds digit, and thus there may be one code point 62 for several trunk circuits 6 whose directory numbers have the same hundreds digit.) Thus, when the telephone number of a trunk circuit is dialled by the test board, the decoder-marker decodes that telephone number and closes appropriate cross-points to connect that specific trunk circuit to the horizontal link being used on the call.

Moreover, in accordance with the invention, one of contacts LR1-2 to LRN-2 closes to instruct the register-sender that the type of outpulsing is "direct," i.e. that there is to be no outpulsing. One of contacts LR1-3 to LRN-3 closes to instruct the register-sender that zero digits should be sent, and one of contacts LR1-4 to LRN-4 closes to instruct the register-sender that the type of circuit attached is to be a line circuit (even though in fact a trunk circuit may be attached), so that the only test that the register-sender will conduct will be a busy test.

On ordinary local calls to a called party, the decoder-marker operates a ringing relay in the line circuit of the called party. The ringing relay locks operated to the line relay of the called line circuit and applies ringing until the called party answers, operating the line relay which terminates the ring. Trunk circuits are not equipped with ringing relays, so there is no need to provide any special means to prevent ringing.

Figure 8:
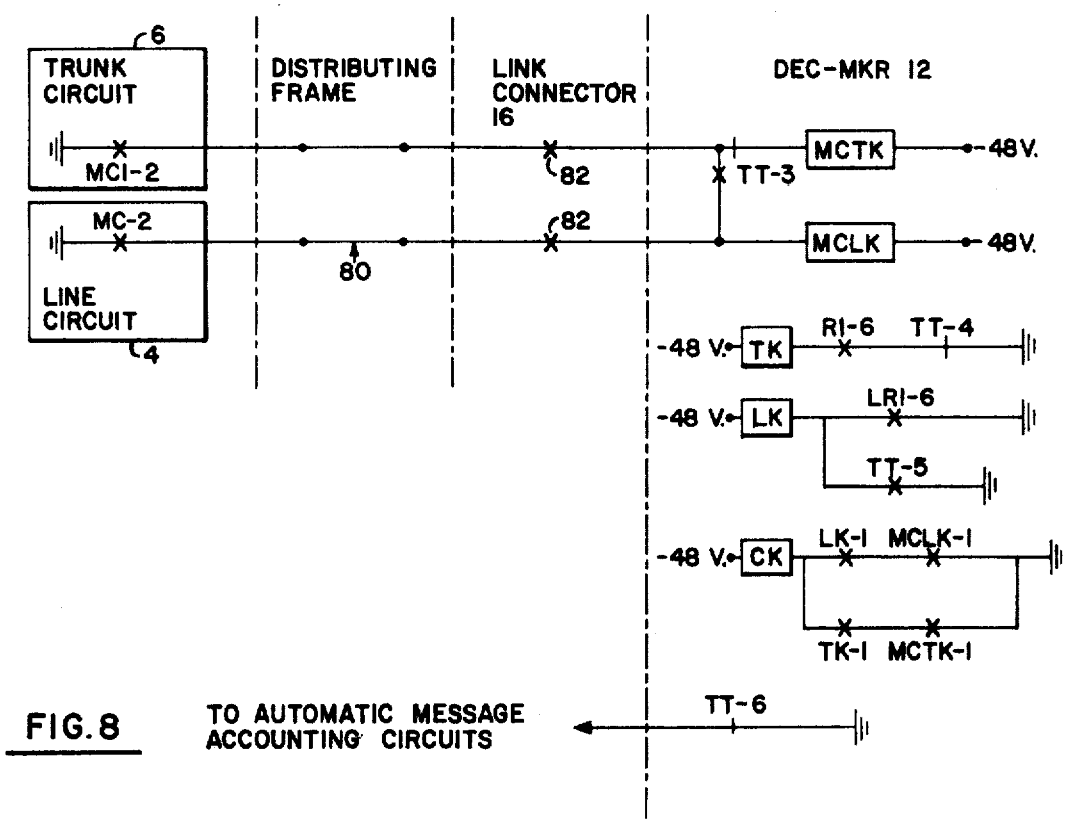
FIG. 8 shows a modified checking circuit for the FIG. 1 office.

Reference is next made to FIG. 8, which shows further consequences of the operation of relay TT. As shown in FIG. 8, the decoder-marker in a model 758 C office is equipped with a marker line check relay MCLK and a marker trunk check relay MCTK. Normally, when the decoder-marker 12 seizes a line circuit 4, the line circuit, through marker connect relay contact MC-2, cross-connections 80 in the distributing frame, and link connector contacts 82, operates relay MCLK in the decoder-marker. When the decoder-marker seizes a trunk circuit 6, the trunk circuit, through marker connect relay contact MC1-2, the cross-connections 80, and the link connector operates relay MCTK in the decoder-marker. In addition, when a route relay (e.g. relay R1) in the decoder-marker is operated for an outgoing trunk circuit, contact R1-6 operates trunk relay TK in the decoder-marker. When a local route relay (e.g. relay LR1) operates in the decoder-marker, contact LR1-6 operates relay LK in the decoder-marker. For checking purposes, check relay CK in the decoder-marker operates and allows the call to proceed if relays LK and MCLK are operated, or if relays TK and MCTK are operated (via contacts TK-1 and MCTK-1 or via contacts LK-1 and MCLK-1), but not if for example relay LK and relay MCTK are operated.

In a test call, although the decoder-marker 12 effects a connection to a called trunk circuit, this is done with the aid of a local route relay LR1 to LRN, so that unless appropriate provision is made, check relay CK will not operate and the decoder-marker will not allow the call to proceed. Therefore, contacts TT-3 are provided so that when relay TT operates on a test call, then when the decoder-marker seizes the called trunk circuit 6, the trunk circuit operates the marker line check relay MCLK instead of the marker trunk check relay MCTK. In addition, contacts TT-4 open to prevent any possible operation of trunk relay TK in the marker and contacts TT-5 close to ensure operation of line check relay LK, thus operating check relay CK so that the decoder-marker can proceed with the connection.

In addition, as shown in FIG. 8, when relay TT operates, contact TT-6 opens to disable all automatic message accounting equipment, so that no bills are made out when test calls are made.

In summary at this point, trunk circuits are assigned local office telephone numbers, just as are ordinary line circuits, and the decoder-marker decoding circuits are cross-connected to operate when the number of a trunk circuit is dialled by the test board 30. The decoder-marker then effects a connection directly to the trunk circuit as if it were a local line circuit, rather than selecting a trunk circuit group and then sequentially seizing one of the trunk circuits in the group. In addition, the local route relay contacts in the decoder-marker instruct the register-sender that zero digits are to be sent, that the type of outpulsing is direct, and that only a line circuit test is to be conducted on the outgoing trunk circuit. Once the decoder-marker effects connection of the register-sender and the required outgoing trunk circuit to the test board and instructs the register-sender, it releases itself, and the register-sender also releases itself once it has effected the required line test. The result is that the test board 30 is now connected directly to the office B, trunk circuit at the far end of the outgoing office A trunk circuit in question.

Figure 9:
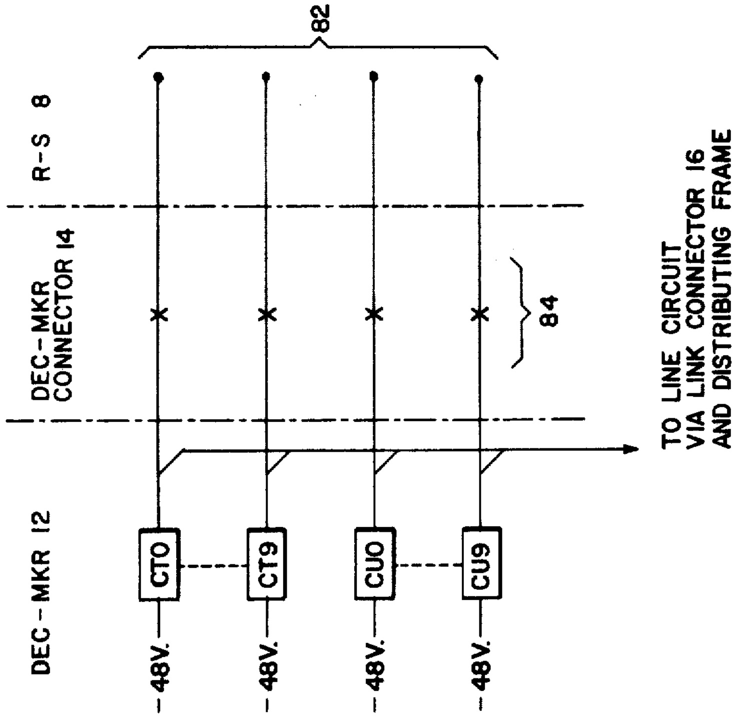
FIG. 9 shows a circuit for operating class-of-service relays in the FIG. 1 office.

The operation of the equipment when the call from the test board reaches office B (FIG. 3) will next be described. In office B, since the call is received (for example) over incoming trunk 6B-500 (FIG. 3), no class-of-service indication is available to the decoder-marker from the trunk location. This is because only line circuits, and not trunk circuits, are equipped with class-of-service CS terminals (FIG. 4) to operate class-of-service relays in the decoder-marker. However, in the model 758 C office, class-of-service digits are forwarded in conventional manner on ordinary inter-office calls by having the register-sender in office A (for example) prefix two digits for the class-of-service. The class-of-service digits operate digit register relays (not shown) in the register-sender 8B of office B, and contacts (not shown) of the digit register relays ground appropriate ones of leads 82 (FIG. 9) from the register-sender through the decoder-marker connector cross-points 84 to the decoder-marker to operate the appropriate class-of-service relays CT0 to CT9, CU0 to CU9 in the decoder-marker.

In the case of a test call, the test board 30 is connected directly to the register-sender in office B, so that the register-sender in office A is not available to prefix the class-of-service tens and units digits. Therefore, the test board operator, as discussed, will himself prefix these digits by dialling them directly into the register-sender in office B. He does not dial the local office code of office B, since office B is the completing office for this call. Thus, after dialling the class-of-service digits, the test board operator simply dials the hundreds, tens and units digits of the telephone number assigned to the equipment in office B to which the test board operator desires a connection. As previously discussed, such equipment may be a piece of test equipment in office B, or it may be a trunk circuit outgoing to office C.

If desired, the test board 30 may include a computer which automatically sequentially dials trunk circuits to be tested, sets up connections from such trunk circuits to desired testing equipment in the second or third (or even more remote) offices, and effects tests on the trunks. Various kinds of test equipment may be used, for example a balance test circuit, a loop around test circuit, an impedance test circuit, etc. After the computer at the test board 30 has for example tested all of the trunks between office A and office B, it can then reach office B via one of these tested trunks and then test in tandem with such trunk all of the trunks from office B to office C.

Figure 10:
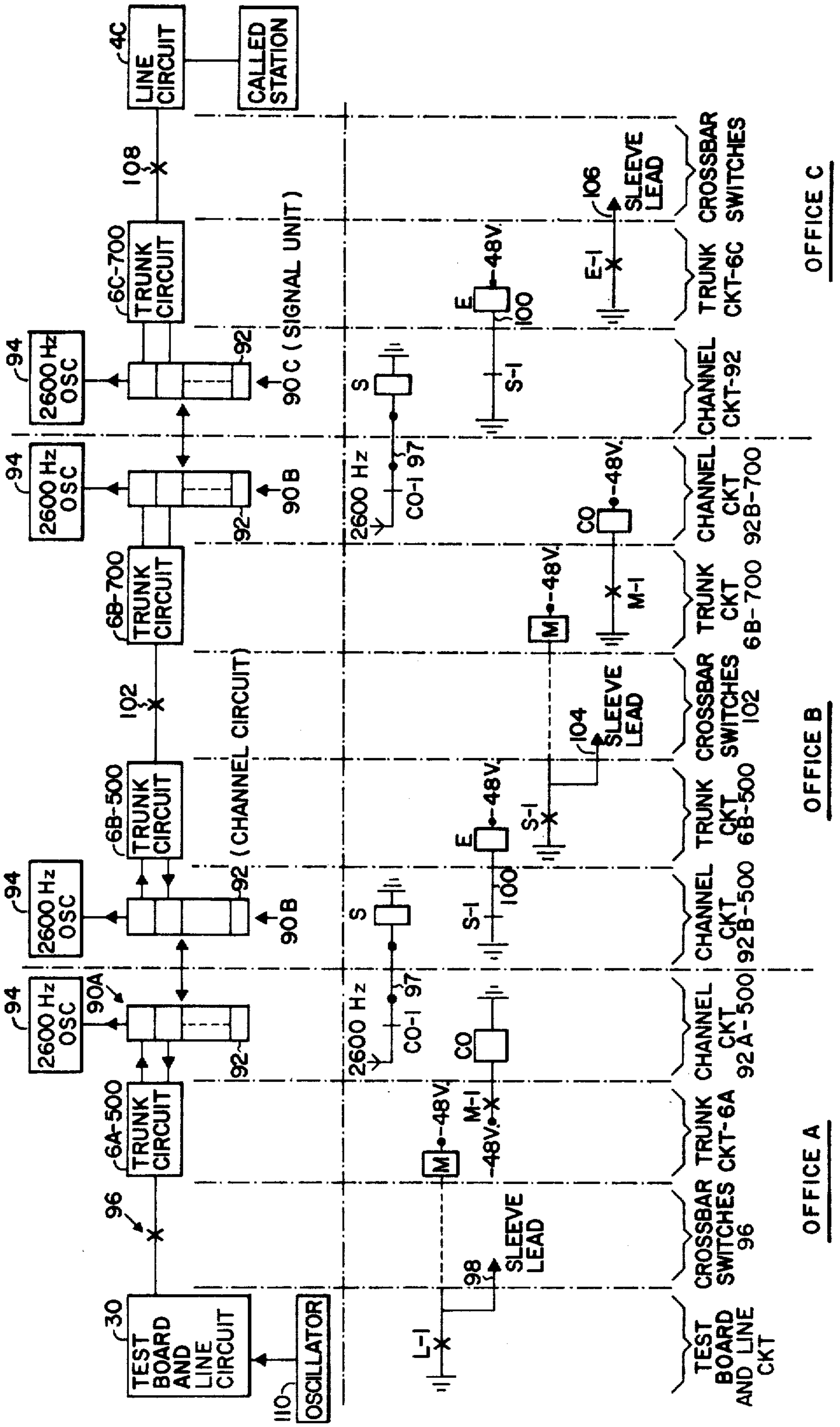
FIG. 10 is in part a block diagram showing three offices connected together, with circuit details of portions of the block diagram shown below the block diagram.

When the test board operator or the computer in office A wishes to test all of the trunks between offices B and C, in tandem for example with trunk number 500 from office A to office B, it is undesirable to have to set up a new connection through trunk 500 each time a new trunk between offices B and C is being tested. Therefore, the invention provides means for holding the connection between offices A and B while releasing and re-establishing the connection between offices B and C as each new trunk between offices B and C is tested. This feature is described with reference to FIG. 10, which shows a standard "L carrier" system connecting offices A, B and C. The top portion of FIG. 10 shows circuits in block form, and the bottom part of FIG. 10 shows certain specific components of the circuits shown in the top part of FIG. 10, for convenience in explaining the operation of FIG. 10.

In the standard four wire L carrier system which is presently used commercially, each office contains signals units 90A, 90B, 90C. Each signal unit contains a number of channel circuits 92. The signal units transmit microwave signals between the offices, the signals carrying a number of talking or data channels. In the four wire system under consideration, there are two channel circuits 92 between associated trunk circuits, one for a transmit signal and one for a receive signal (to permit a subscriber to transmit and receive data simultaneously). In the idle condition, oscillators 94 place a 2,600 Hz signal on the transmit and receive pairs of each channel circuit. When a calling party (e.g. the test board) in office A makes a call via trunk circuit 6A–500, his line relay (not shown) operates nd its contact L–1 extends a ground through the office A switching network 96 into the outgoing trunk circuit 6A–500. The ground operates an M relay in the trunk circuit 6A–500, and contact M–1 applies –48 volts to a cut-off relay CO in the channel circuit 92A–500, which it is assumed is the transmit channel for trunk circuit 6A–500. Cut-off relay contact CO–1 then removes the 2,600 Hz signal from the transmit pair 97 of the channel. Contact L–1 also grounds sleeve lead 98 of office A to hold the cross-points of the office A switching network operated.

At the receiving channel circuit 92B–500, receiver S is normally operated from the 2,600 Hz signal received over the transmit pair 97. When the 2,600 Hz signal is removed, receiver S is de-energized, and its contact S–1 closes to ground the E lead 100 to trunk circuit 6B–500 to operate relay E therein. Relay E is in effect the line relay of the incoming trunk circuit 6B–500. Then, after a connection is established in office B from trunk circuit 6B–500 to (for example) trunk circuit 6B–700, through the switching network 102 of office B, contact E–1 operates the M relay in the outgoing trunk circuit 6B–700, and this de-energizes the S receiver in office C as described in connection with office A. Contact E–1 also grounds the sleeve lead 104 in office B to hold the cross-points 102 operated. With receiver S in office C de-energized, its contact S–1 operates relay E in office C to cause the office C decoder-marker to summon an idle office C register-sender. Contact E–1 in office C grounds sleeve lead 106 in office C to hold the cross-points 108 of the switching network, once they are operated.

Once a connection has been set up in office C to the required equipment, then when the equipment "answers," its line relay removes the 2,600 Hz signal from the receive pair (not shown) extending from office A to office C. This removal of the 2,600 Hz signal from the receive pair does not hold any cross-points; the removal is solely to provide an answer entry in office A for billing purposes and also to prevent interference with communication.

After the test board has completed its testing of a trunk between offices B and C in tandem with a trunk between offices A and B, it applies 2,600 Hz to the transmit pair by means of oscillator 110. This does not affect the connection between offices A and B, because this connection is held by the ground on sleeve lead 98, supplied by the line relay of the test board. However, the 2,600 Hz signal operates receiver S in office B, releasing the E relay in office B which releases the cross-points in office B, and the entire connection from (but not including) incoming trunk 6B–500 and beyond then releases.

The test board 30 now removes the 2,600 Hz signal from the transmit pair to office B. Since the connection to the trunk circuit 6B–500 in office B is still established, receiver S is de-energized again, operating line relay E in the trunk circuit 6B–500 and calling in the register-sender in office B, so that a second dial tone is received again. The test board may then dial again to obtain a new trunk to office C.

Although the invention has been described in connection with testing trunks between three offices in tandem, it will be apparent that the invention can be used to test trunks between more than three tandem offices. The invention has been described in connection with a square matrix crossbar office, and the invention is particularly suitable for use therewith since each trunk has in effect a line location, and therefore telephone numbers can conveniently be assigned to such trunks. The invention can however be applied to any type of crossbar office. For example, the invention can be applied to number 5 crossbar offices. However, in number 5 crossbar systems, lines appear on line link frames and trunks appear on trunk link frames, with a switch link between the frames to connect a line to a trunk. In number 5 crossbar, lines are identified by the number group frame from the digits dialled, while trunks are random selected from the dialled office or from the area code only. Thus, for number 5 crossbar systems, it would be necessary to provide every trunk with a line link location as well as a trunk link location, so that each trunk will have the appearance of a local line circuit in order that the marker can establish a connection so that particular trunk when it receives appropriate digits.

TABLE I.—INTER-OFFICE CALLING

Digits: CT, CU, N, N, X, H, T, U

| | Tandem route | | | | | | | | | | Direct route | | | | | |
|---|---|---|---|---|---|---|---|---|---|---|---|---|---|---|---|---|
| Customer dials | | | N | N | X | H | T | U | | | N | N | X | H | T | U |
| Originating office: Receives | CT | CU | N | N | X | H | T | U | CT | CU | N | N | X | H | T | U |
| Sends | CT | CU | N | N | X | H | T | U | CT | CU | | | | H | T | U |
| Tandem office: Receives | CT | CU | N | N | X | H | T | U | | | | | | | | |
| Sends | CT | CU | | | | H | T | U | | | | | | | | |
| Completing office: Receives | CT | CU | | | | H | T | U | CT | CU | | | | H | T | U |

What we claim is:

1. In a telephone crossbar system comprising:

a. first and second offices, b. at least one trunk group interconnecting said offices and including a plurality of trunks, c. first and second common control means in said first and second offices respectively, d. said first common control means including first register means adapted to be connected to a calling circuit in said first office to receive digit information therefrom, said first common control means further including first switching control means responsive to receipt of digit information by said first register means indicative of a call to said second office for seizing an idle one of said trunks in said group and for establishing a connection between said calling circuit and such idle trunk, and first sender means for transmitting digit information through such trunk following seizure of such trunk, e. said second common control means including second register means for receiving digit information, and second switching control means responsive to receipt of a call over one of said trunks for connecting said second register means to such trunk to receive digit information therefrom, f. said second switching control means including means responsive to receipt of digit information from said second register means indicative of a call to a called circuit in said second office for establishing a connection between the calling trunk and said called circuit in said second office, improved means for testing said trunks, comprising:

g. a test circuit in said first office and including means for testing selected characteristics of said trunks, h. said test circuit including means adapted to be connected to said first register means for transmitting thereto first predetermined digit information indicative of a selected trunk in said group, i. said first switching control means including means responsive to receipt of said first predetermined digit information by said first register means for connecting said test circuit directly to said selected trunk, said first switching control means including means for preventing transmission of digit information by said sender means to said selected trunk upon receipt of said predetermined digit information from said test circuit, whereby said test circuit is connected directly through said selected trunk to said second register means, so that digit information can be dialled directly from said test circuit into said second register means to establish a connection from said selected trunk to a called circuit in said second office.

2. A telephone system according to claim 1 and including:

j. a third office and a second trunk group inter-connecting said second and third offices, said second trunk group including a plurality of trunks, k. said second switching control means including means responsive to receipt of digit information by said second register means indicative of a call to said third office from a calling circuit for seizing a trunk in said second trunk group and for establishing a connection between such calling circuit in said second office and such trunk, and second sender means for transmitting digit information through such trunk following seizure thereof, l. said third office including third common control means, said third common control means including third register means for receiving digit information, and third switching control means responsive to receipt of a call over a trunk to said third office for connecting said third register means to such trunk to receive digit information therefrom, m. said third switching control means including means responsive to receipt of digit information from said third register means indicative of a call to a called circuit in said third office for establishing a connection in said third office from the calling circuit to the called circuit in said third office, n. said second switching control means including means responsive to receipt by said second register means of second predetermined digit information from said selected trunk from said first office to said second office, said second predetermined digit information being indicative of a predetermined trunk from said second office to said third office, to connect said predetermined trunk directly to said selected trunk, said second switching control means further including means for preventing transmission of digit information by said second sender means through said predetermined trunk upon receipt of said second predetermined digit information from said selected trunk, whereby said test circuit is connected directly through said selected trunk and said predetermined trunk to said third register means in said third office, so that digit information can be dialled directly from said test circuit into said third register means to establish a connection from said predetermined trunk in said third office.

3. In a telephone system comprising:

a. first, second and third offices, each including a plurality of line circuits and a plurality of trunk circuits, b. a plurality of trunks extending between said offices and interconnecting said trunk circuits, c. each office including:

i. link frame means, and means connecting each line circuit and each trunk circuit of an office to said link frame means of such office so that each line circuit and each trunk circuit has an equipment location on such link frame means, ii. common control means, said common control means including register means adapted to be connected to a calling circuit in its associated office and to receive digit information therefrom, said common control means also including decoder-marker means responsive to receipt of digit information indicative of an equipment location in its associated office to connect the calling circuit to such called equipment location and also being responsive to receipt of digit information indicative of a called circuit in another office to select an idle one of said trunk circuits connected to a trunk to such other office, said common control means also including sender means for transmitting digit information to such other office through such idle trunk circuit, improved means for testing said trunks, comprising:

d. a test circuit in said first office and including means for testing selected characteristics of said trunks, said test circuit including means adapted to be connected to the register means of said first office of transmitting thereto predetermined digit information indicative of the equipment location of a first selected trunk circuit in said first office, e. said decoder-marker means of said first office including means responsive to receipt of said first selected digit information to connect said test circuit directly to said first selected trunk circuit and further including means for preventing transmission of digit information by said sender means in said first office to said first selected trunk circuit, whereby to connect said test circuit directly to said register means of said second office, f. said decoder-marker means of said second office including means responsive to receipt of second selected digit information from the register means of said second office, received from said test circuit through said first selected trunk circuit, such digit information being indicative of an equipment location of a second selected trunk circuit in said second office, to connect said first selected trunk circuit directly to said second selected trunk circuit, and further including means for preventing transmission of digit information by said sender of said second office to said second selected trunk circuit, whereby to connect said test circuit directly through said first and second selected trunk circuits to said register means of said third office.

4. A telephone system according to claim 3 wherein said decoder-marker means of each office includes trunk preference selection means for sequentially selecting idle trunks from such office to another office, said decoder-marker means of each office further including an office code field and a directory number code field, said office code field including: a local program relay and a plurality of further program relays, means for operating said local program relay following receipt from its associated register means of digit information indicative of a local office code and means for operating one of said further program relays upon receipt from its associated register means of digit information indicative of the office code of another office; means connected to said further program relays for operating said trunk preference selection means for selection of an idle trunk upon operation of one of said further program relays; means connected between said local program relay and said directory code field for enabling said directory code field upon operation of said local program relay; said directory number code field including: a plurality of local route relays, means operative in response to receipt of digit information from its associated register means indicative of a local directory number to operate a selected local route relay dependent on the directory number received, said last mentioned means including means responsive to receipt of digit information indicative of the equipment location of a trunk circuit to operate a said local route relay; and means connected to each local route relay of each office and adapted to be connected to said sender means of such office to cause said sender means to send zero digits upon operation of a said local route relay.

5. A telephone system according to claim 4 wherein said decoder-marker of each office includes first and second trunk test relays, means in each trunk circuit for operating said first trunk test relay when said decoder-marker seizes such trunk circuit during a call to such trunk circuit, and means in said decoder-marker of each office responsive to operation of any of said further program relays for operating said second trunk test relay, said decoder-marker of each office also including first and second line test relays, means in each line circuit for operating said first line test relay when said decoder-marker seizes such line circuit during a call to such line circuit, and means in said decoder-marker of each office responsive to operation of said local program relay for operating said second line test relay, said decoder-marker means of each office including check relay means operative in response to operation of both said trunk test relays or both said line test relays to allow a call to proceed, said decoder-marker means of each office further including a plurality of class-of-service relays, and means in each line circuit of each office for operating selected ones of said class-of-service relays on initiation of a call, said test circuit having a line circuit including means for operating predetermined class-of-service relays upon institution of a call by said test circuit, said decoder-marker means of each office also including a test relay operative on operation of said predetermined class-of-service relays, and means responsive to operation of said test relay to operate said check relay means on operation of said second line test relay and of said first truck test relay.

6. A telephone system according to claim 5 wherein said sender means in each office includes means for sending digits indicative of the class-of-service of the calling circuit forward on a call to another office for operating the class-of-service relays of the decoder-marker in the receiving office, said directory number field of each decoder-marker including matching means for matching the class-of-service of the calling circuit with the called number and for permitting completion of selected calls and for denying completion of other calls, and means connected between said test relay and said matching means for setting said matching means to a condition in which it permits completion of all calls when said test relay is operated.

* * * * *